(12) United States Patent
Weckström

(10) Patent No.: US 6,674,996 B1
(45) Date of Patent: Jan. 6, 2004

(54) MOBILE PHONE ACCESSORY, PARTICULARLY FOR THE HANDS-FREE FUNCTION, AND AN ARRANGEMENT

(75) Inventor: Anders Weckström, Kirkkonummi (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/471,050

(22) Filed: Dec. 22, 1999

(30) Foreign Application Priority Data

Dec. 23, 1998 (FI) .................................. 982791

(51) Int. Cl.[7] ................................ H04B 1/38
(52) U.S. Cl. ............... 455/90.3; 455/575.1; 455/575.8; 455/569.1; 381/357
(58) Field of Search .................. 455/569, 90, 575, 455/31, 33, 89, 570, 425, 501, 63, 67.3, 550, 557; 379/420.03, 433.03, 446, 454; 381/355–358

(56) References Cited

U.S. PATENT DOCUMENTS

| | | | | |
|---|---|---|---|---|
| D327,070 S | * | 6/1992 | Watanabe | D14/251 |
| 5,333,176 A | * | 7/1994 | Burke et al. | 455/412 |
| 6,108,415 A | * | 8/2000 | Andrea | 379/433.03 |
| 6,195,572 B1 | * | 2/2001 | Patterson et al. | 455/569 |

FOREIGN PATENT DOCUMENTS

| EP | 0827360 A2 | 3/1998 |
|---|---|---|
| WO | WO 95/12961 | 5/1995 |
| WO | WO 98/17046 | 4/1998 |
| WO | WO 99/02010 | 1/1999 |

* cited by examiner

*Primary Examiner*—Edward F. Urban
*Assistant Examiner*—Sonny Trinh
(74) *Attorney, Agent, or Firm*—Perman & Green, LLP

(57) ABSTRACT

The object of the invention is a particular accessory and an arrangement for a mobile phone (5) and its hands-free function, for instance in a car. Thanks to the accessory, such as a cradle (16), the characteristics of the mobile phone (5) are changed, preferably for the hands-free function, due a strip (17) which covers at least one of the at least two sound openings (7A, 7B) of the pressure gradient microphone (7) of the mobile phone. The sound opening can be covered also by a special flange of an accessory connector, or by a separate bridge mounted in the cradle. The covering can also be sealed with a rubber seal, for instance.

19 Claims, 5 Drawing Sheets

PRIOR ART

PRIOR ART

MOBILE PHONE ACCESSORY, PARTICULARLY FOR THE HANDS-FREE FUNCTION, AND AN ARRANGEMENT

The object of the invention is a new advantageous mobile phone accessory for the hands-free function, with the aid of which the characteristics of a mobile phone with a connected accessory are changed into an operating mode associated with the accessory, such as hands-free operation in a car; and an arrangement formed by a cradle and the mobile phone; and further an accessory connector.

From the patent publication WO 95/12961 there is known a system consisting of a number of low directivity microphones and a high directivity microphone based mostly on the pressured difference and realised with a processor. In addition to the low directivity of the separate microphones the system is based on the sound delay from a first microphone to the next one, and on the processing of data which is obtained from different microphones, whereby the processing is based on the delay of the sound.

From the patent publication WO 98/17046 there is known a mobile phone microphone arrangement, due to which the microphone provides an electrical signal corresponding to the user's voice, in spite of the background noise. The arrangement is based on the use of a pressure difference microphone, so that both the user's voice and the background noise is directed from the front of the device via a voice opening to the first side of the microphone, and only background noise from the side of the device noise is directed via a noise opening to the other side of the microphone. The major part of the background noise is attenuated by being compensated from the opposite sides of the membrane of the pressure difference microphone. The user's voice acts on the membrane mainly via the voice opening, so that the microphone output provides a signal corresponding almost only to the user's voice.

FIG. 1A shows the schematic structure of a known microphone operating by the pressure difference (pressure gradient microphone), and there is shown the microphone frame 1, on the left the first sound opening 1A, on the right a second sound opening 1B, and a membrane 2. The sound via both openings 1A, 1B acts on the membrane 2 so that the membrane provides a signal according to the momentary pressure difference of the sound. FIG. 1B shows the schematic structure of a known pressure microphone, and there is shown the microphone frame 3, a single sound opening 3A and a membrane 4. All sounds coming through the sound opening 3A act on the membrane 4. The membrane 4 located centrally in the microphone 3 generates a signal which corresponds only to the pressure supplied through the opening 3A.

There is also a known mobile phone which contains both a pressure microphone and a pressure gradient microphone in order to attenuate interference caused by the wind.

There is also a known mobile phone 5 according to FIG. 2, which shows a loudspeaker 6, the voice and noise openings 7a, 7B of a pressure gradient microphone, an end plate 8, a keypad 9 defined by the broken lines, and a display 10. In this mobile phone 5 the openings 7A, 7B of the pressure gradient microphone are close to each other restricted by the small end plate 8 at the lower end of the device 5. When the user talks and keeps the device 5 at the side of his head the voice acts causing a pressure difference between the microphone openings 7A, 7B. Thus the microphone generates a signal corresponding to the voice, but the noise directed simultaneously to both openings does not cause any signal. Further a noise from a direction opposite to that of the voice can be attenuated in a known way by data processing.

A problem in known arrangements is the use of a telephone provided with a noise suppression arrangement in such situations where the telephone is not held at the side of the head. Then the noise suppression attenuates also the voice. Such situations are for instance the hands-free function when the device is in a cradle, such as in a car cradle or in table-top cradle.

The object of the invention is to present a solution for a mobile phone containing a noise suppression arrangement, by which the mobile phone advantageously can be used both close to the head and also in a cradle or connected to an accessory, without attenuating the voice and particularly the low frequencies of the voice.

The invention relates to a mobile phone accessory, particularly for such a mobile phone hands-free application which consists of noise suppression based on a pressure gradient microphone having at least two sound openings, whereby the characteristics of the mobile phone are changed with the aid of the accessory. According to the invention the accessory comprises a projection for covering at least one of the at least two openings in the cover of the mobile phone when attached to the mobile phone.

The invention relates also to an arrangement for the hands-free function of a mobile phone, which arrangement includes a mobile phone having a noise suppression based on a pressure gradient microphone with at least two sound openings, and an accessory due to which the characteristics of a mobile phone attached to the accessory are changed. According to the invention the accessory comprises a projection for covering at least one of the at least two openings in the cover of the mobile phone when the mobile phone is attached to the accessory.

The invention relates also to a cradle part, thanks to which the characteristics of a mobile phone, which is mounted in the cradle and which contains noise suppression based on a pressure gradient microphone with at least two sound openings, are changed for the hands-free function. According to an advantageous embodiment of the invention the cradle part comprises a bridge or a projection which can be mounted so that it covers at least one of the at least two sound openings when the mobile phone is placed in the cradle, in order to obtain the characteristics of a pressure microphone with a pressure gradient microphone.

The invention relates also to an arrangement for the hands-free function of a mobile phone, whereby the arrangement includes a mobile phone having noise suppression based on a pressure gradient microphone with at least two sound openings, and a connector, thanks to which the characteristics of the mobile phone are changed. According to an advantageous embodiment of the invention the connector connected to the mobile phone comprises a flange for covering at least one of the at least two sound openings of the mobile phone in order to obtain the characteristics of a pressure microphone.

The invention saves the costs of a particular electronic implementation. The strip covering one of the pressure gradient microphone's two sound openings will not essentially increase the manufacturing costs and is thus advantageous.

The invention also saves the possessor of the mobile phone from the purchase of a separate table-top cradle when for instance a connector of a battery charger is available to him, whereby the connector includes a flange according to an advantageous embodiment of the invention. The mounting of the connector provides automatically microphone characteristics according to the hands-free function.

The pressure gradient microphone used for noise suppression performs substantially better than a pressure microphone regarding sounds generated in close range, when the case is examined in the light of the interference ratio. However, a pressure gradient microphone has a poor sensitivity to low frequency sounds at longer distances, whereby the interference ratio also deteriorates. An advantage of the invention is that the characteristics of a pressure gradient microphone change so that they are like those of a common pressure microphone, whereby the microphone's sensitivity increases, particularly at low sounds. No second microphone nor a headset is required thanks to the invention. Advantageous embodiments of the invention are presented in the dependent claims.

The invention is described in detail below with reference to the enclosed drawing, in which FIG. 1 shows the structures of known microphones;

Figure 1A:
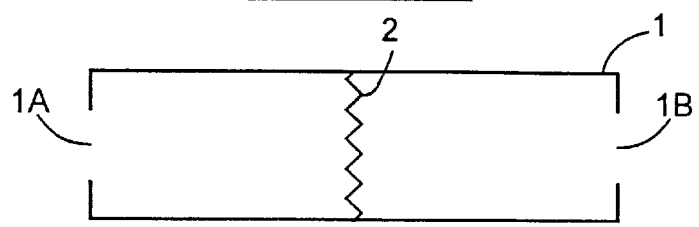
Figure 1B:
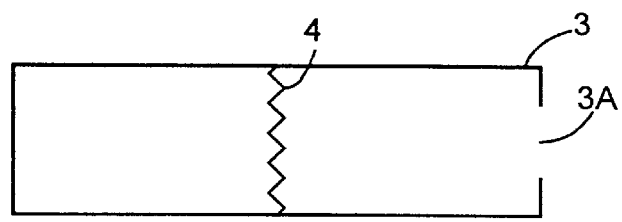
Figure 2:
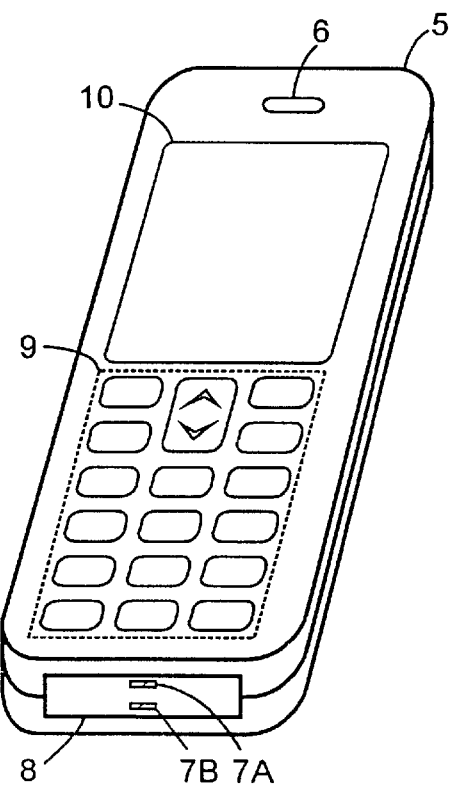
FIG. 2 shows a mobile phone.

The FIGS. 1 and 2 were dealt with above in the prior art section.

Figure 3:
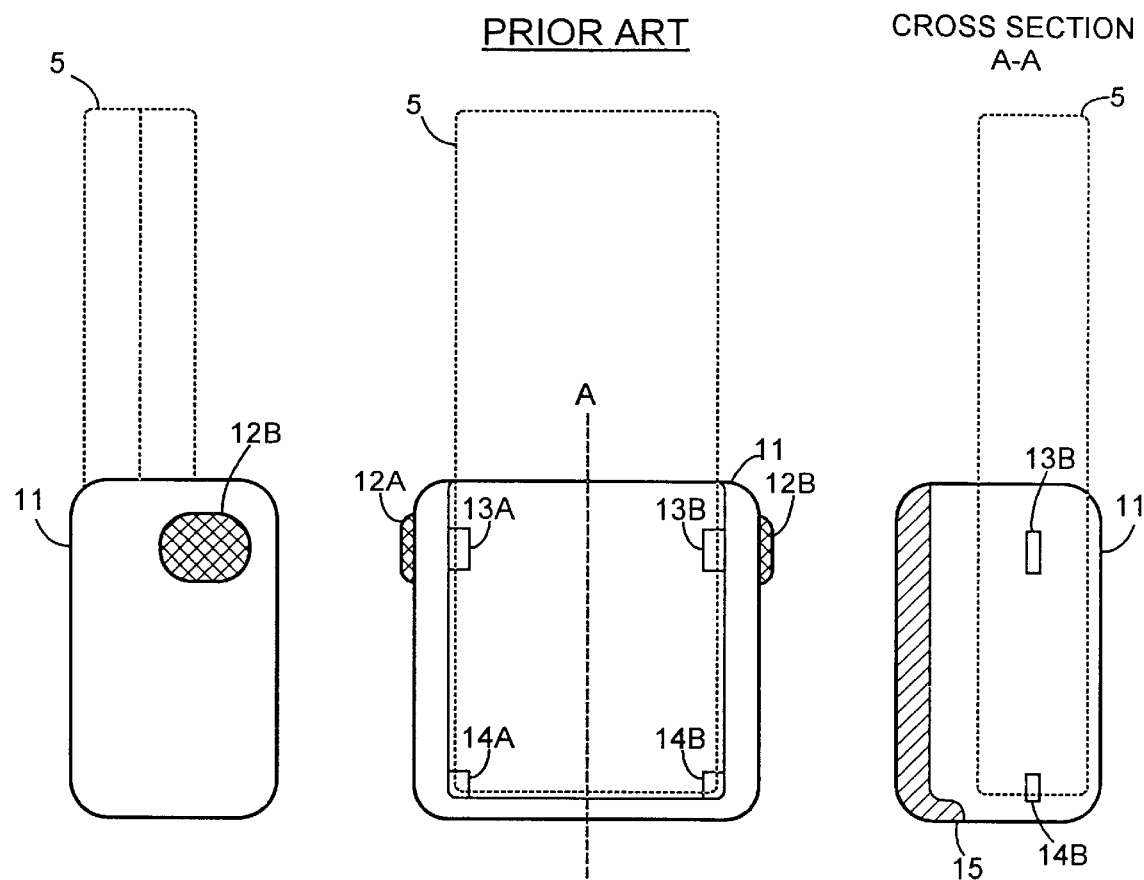
FIG. 3 shows a known mobile phone cradle and a mobile phone.
Figure 3:
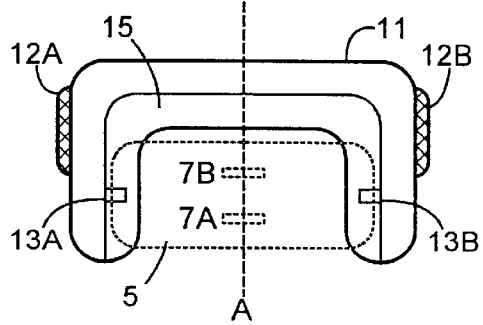

FIG. 3 shows a known cradle 11, such as a car cradle for a mobile phone 5. The cradle 11 is shown in projections from three directions: from the front, from the sides and from above. The cradle turned to the right is drawn in a section along the broken line A—A. In the cradle 11 there is shown a mobile phone 5 defined by the broken lines and the sound openings 7A, 7B for the mobile phone's pressure gradient microphone. The cradle 11 further shows the release buttons 12A, 12B with which the retainers 13A, 13B are released from the sides of the mobile station 5. There are further shown the retainers 14A, 14B and the strip 15 at the bottom of the cradle 11 which hold the mobile station's 5 lower part. Most preferably the upper retainers 13A, 13B can be pushed in or pulled in order to put the mobile phone 5 in the cradle and to remove it. The arrangement is illustrated from the front, from the sides, and from above.

Figure 4:
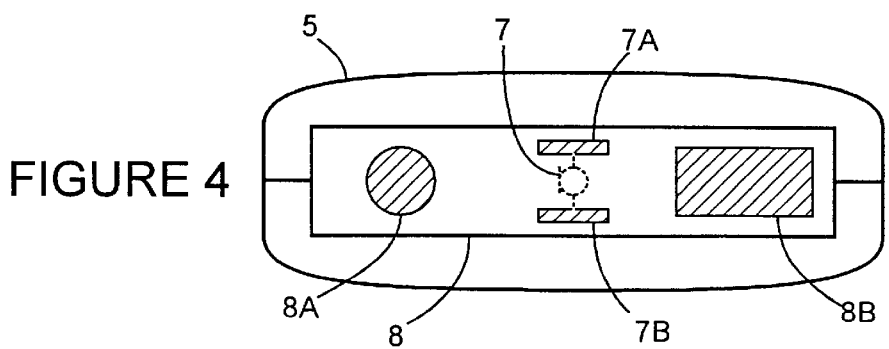
FIG. 4 shows the lower end of a known mobile phone.

FIG. 4 shows in more detail the end plate 8 located in the lower part of the mobile station 5. In this case the end plate 8 includes the sound openings 7A, 7B, a charging connector 8A, and other connectors 8B, such as a data interface.

FIG. 4 shows in an enlargement the lower end of the mobile phone 5 in FIG. 2, whereby the sound openings 7A, 7B for the pressure gradient microphone are seen in the end plate 8 of the cover of the mobile phone, as well as the locations 8A, 8B for the connection of external devices, such as a charging device and a data transmission device.

Figure 5:
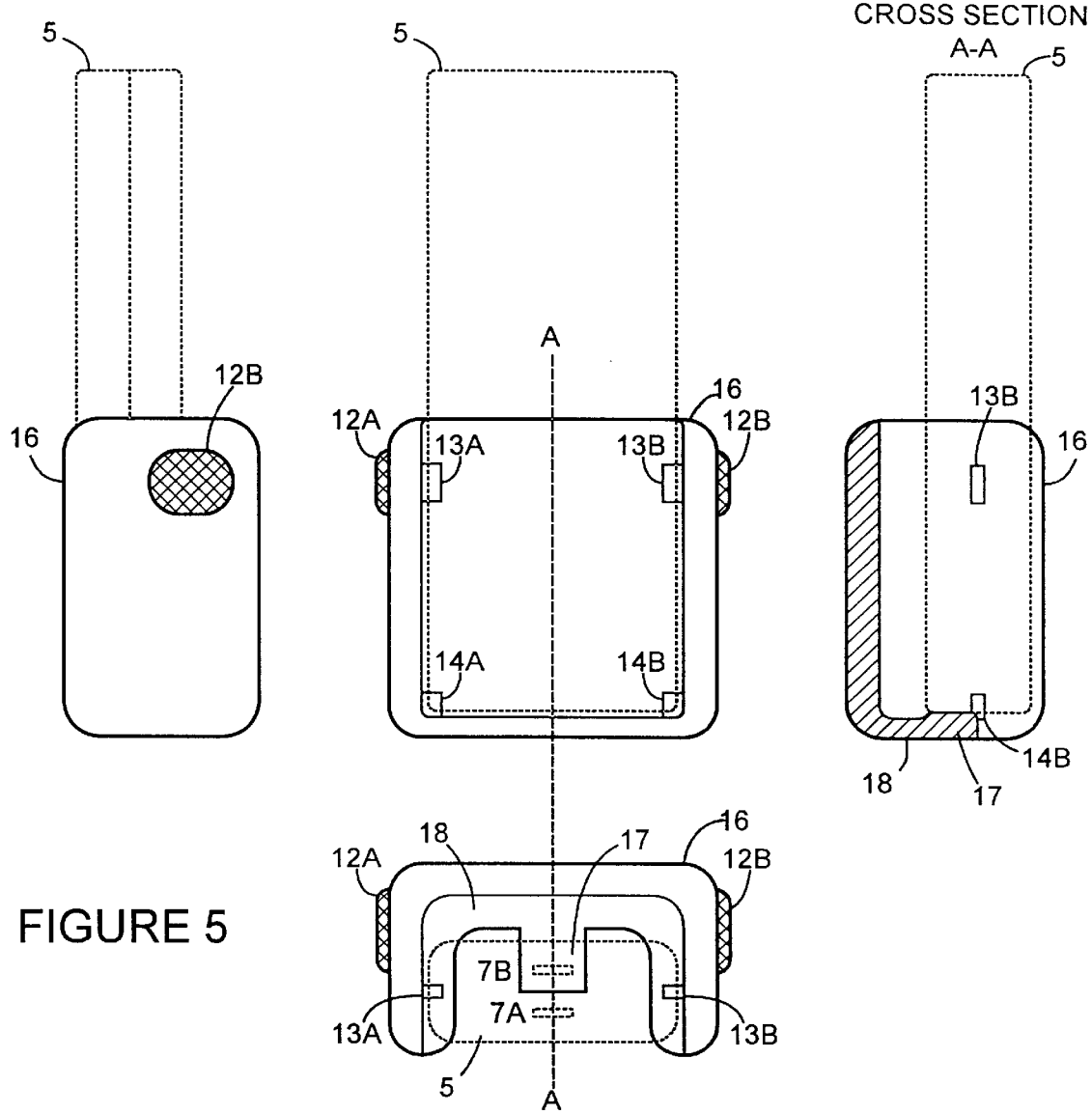
FIG. 5 shows a cradle according to the invention for supporting a mobile phone.

FIG. 5 shows a cradle 16 for a mobile phone 5 according to an advantageous embodiment of the invention. In the cradle 16 there is seen a mobile phone 5 defined by the broken lines, and the sound openings 7A, 7B for the pressure gradient microphone of the mobile phone. The cradle 16 comprises release buttons 12A, 12B; retainers 13A, 13B, 14A, 14B, and a strip 17 in a larger strip 18, which covers the second sound opening 7B of the mobile phone 5. The upper retainers 13A, 13B are most preferably such that they are pressed in when the mobile phone 5 is placed in the cradle, and in order to remove the mobile phone they can be pulled in. The arrangement is illustrated from the front, from the sides, and from above. The cradle turned to the right is drawn in a section along the broken line A—A. The cross-section shows how the strip 17 covers the area of the sound opening in the lower end of the mobile phone 5.

Advantageously, in the accessory, like in a cradle, the projection for covering at least one opening is a strip which substantially covers at least a first opening of at least two openings 7A, 7B of the cover of a mobile phone when the accessory is attached to the mobile phone. According to an advantageous embodiment of the invention the first opening is typically further away from the user than a second opening of the at least two openings in a typical use position of the mobile phone associated with the accessory.

Figure 6:
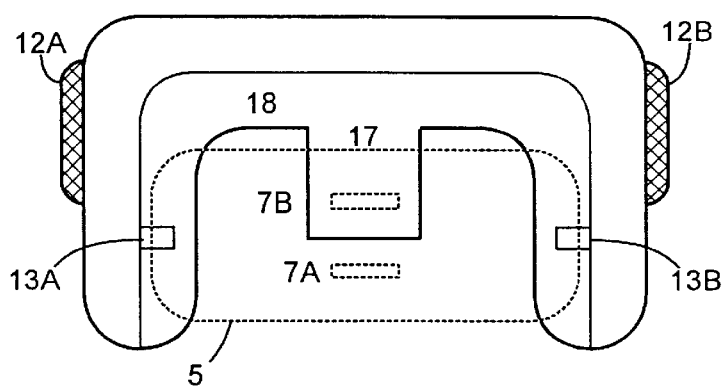
FIG. 6 shows an enlargement of the cradle in FIG. 5 in a top elevation.

FIG. 6 shows in an enlargement the cradle 16 of FIG. 5 from above, where the extension 17 of the strip 18 is seen in a larger size when it covers the sound opening 7B.

Figure 7:
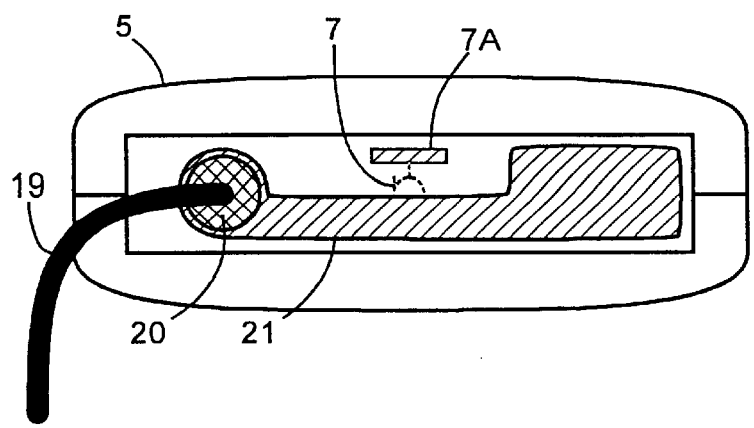
FIG. 7 shows a connector according to the invention at the lower end of a mobile phone.

FIG. 7 shows the connector 20 which receives a conductor 19 and which constitutes the charging connection or data transmission connection of a mobile phone 5 according to an advantageous embodiment of the invention. The flange 21 of the connector 20 covers the second sound opening 7B of the pressure gradient microphone 7. Only the first sound opening 7A is left uncovered. The connector 20 and the flange 21 are mounted for instance in the interfaces 8A, 8B shown in FIG. 4. Generally, it can be said that according to this embodiment of the invention there is arranged a connector for connecting at least one external signal line to a mobile phone. In the connector there is arranged a projection for covering at least one of the at least two openings in the cover of the mobile phone when said connector is attached to the mobile phone. The projection can be a flange of the connector.

Figure 8:
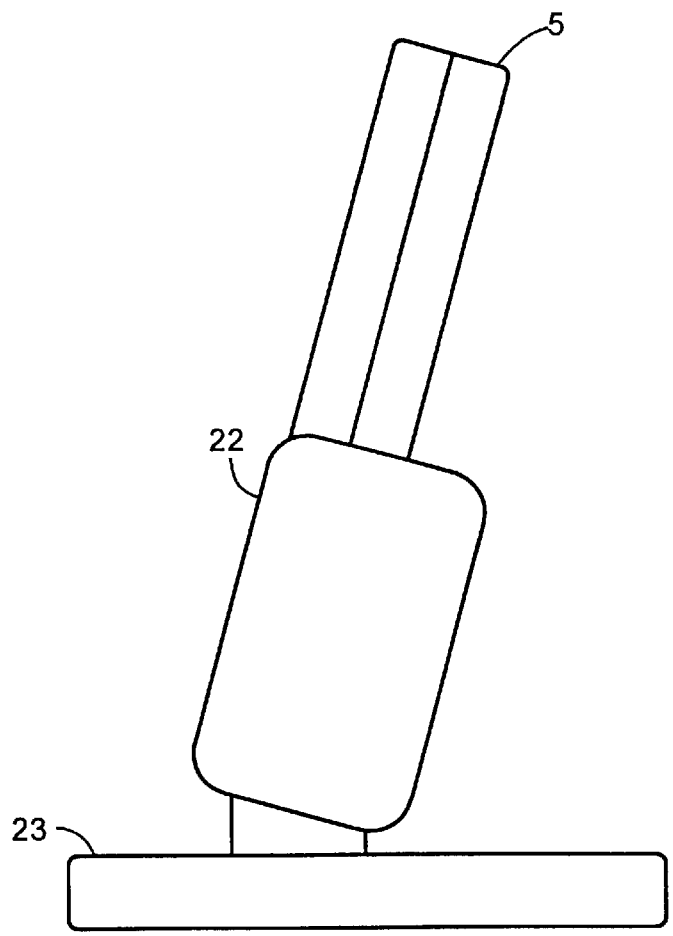
FIG. 8 shows an application of a cradle according to the invention.

FIG. 8 shows an application of the cradle 22 of a mobile phone 5 according to an advantageous embodiment of the invention, where the cradle 22 is fastened to a base 23 for table-top use. Other possible applications are for instance an attachment to the dashboard in a car, or to the map table in a boat.

Figure 9A:
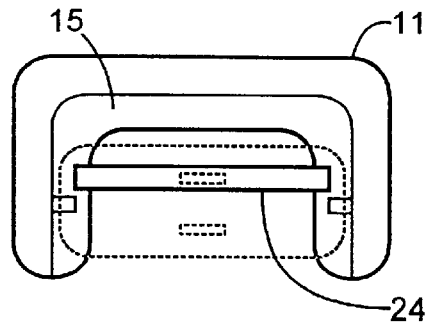
FIG. 9 shows modifications of the arrangement according to the invention.
Figure 9B:
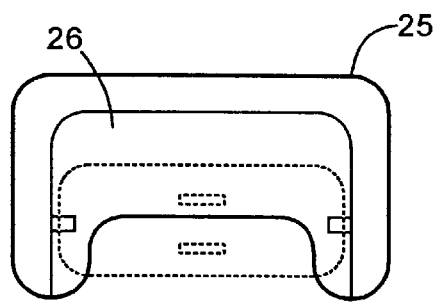
Figure 9C:
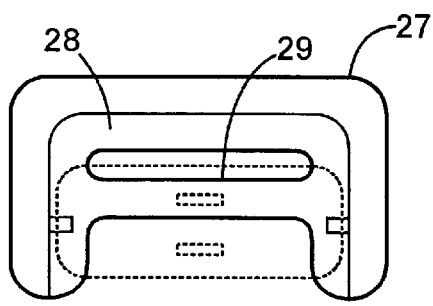

FIG. 9 shows modifications of the arrangement for hands-free operation according to an advantageous embodiment of the invention. The FIG. 9A shows a prior art cradle 11 for a mobile phone, whereby the cradle has a lower strip 15 and a bridge 24 added to it for the inventive functionality in order to cover the sound opening 7B. The bridge 24 is most advantageously attachable afterwards to known cradles 11. The FIG. 9B shows a cradle 25 according to an advantageous embodiment of the invention having a continuous lower strip 26 with the width of the whole mounting opening and which covers half of the lower end of the opening. FIG. 9C shows a cradle 27 according to an advantageous embodiment of the invention which has a fixed bridge 29a containing lower strip 28. Of course also other modifications may be designed. One modification can be such that there is arranged a part of a cradle for a mobile phone, which mobile phone has a pressure gradient microphone and at least two openings in the cover of the mobile phone for passing acoustic waves to the pressure gradient microphone. The part is a bridge or a projection which is arranged to cover at least one opening of the, at least two openings of the cover of a mobile phone the mobile phone is placed in the cradle. Also other kind of modifications are possible.

Figure 10:
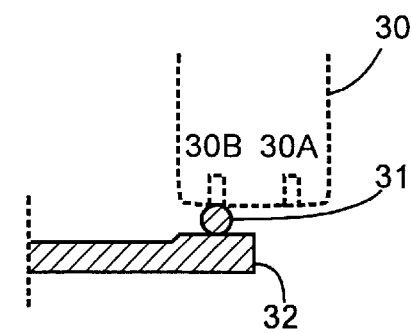
FIG. 10 shows a sealing in an arrangement according to the invention.

FIG. 10 shows a sealing in an arrangement according to an advantageous embodiment of the invention so that it shows a mobile phone 30, the sound openings 30A, 30B and a sealing 31, which here has a circular cross-section, and a strip 32.

The sealing is sufficiently long in order to cover the whole opening.

Let us examine as an example how a mobile phone provided with noise suppression based on a pressure gradient microphone is used without a separate microphone in a car. The mobile phone is in a cradle, and somebody in the back seat or next to the driver wants to speak in the phone. In a common cradle the noise suppression attenuates at least a voice coming from one side of the device, but a cradle according to the invention covers one of the sound openings of the pressure gradient microphone so that the noise suppression does not work. Then it is possible to speak into the microphone, both from the side of the device and from a distance, so that the voice is heard by the microphone when the hands-free function is in use. When the mobile phone is seized and returned to the normal operating mode the noise suppression operates again and only the actual user can speak so that he is heard by the microphone.

The cradles can be separately designed for different telephones, or they can be designed as universal cradles, so that the design observes the different locations of the sound openings. A sound opening can be tightly closed with a rubber pad, for instance.

The mobile phone's hands-free operating mode according to the invention can be obtained also in other embodiments than those presented above. Another advantageous embodiment is a carrying case for the mobile phone which can be fastened to the user's clothes, most advantageously to the belt. Then the mobile phone can be used with the hands-free function when the user is moving and the mobile phone located in the carrying case, which has a projection which according to the invention covers one of the microphone openings.

The invention is not limited to relate only to the above presented embodiment examples, but many modifications are possible within the scope of the inventive idea defined in the claims.

What is claimed is:

1. An accessory for a mobile phone, which mobile phone has a pressure gradient microphone and a cover with at least two openings in the cover for passing acoustic waves to the pressure gradient microphone, wherein said accessory comprises a projection for covering at least one of the at least two openings in the cover of the mobile phone when said accessory is attached to the mobile phone.

2. An accessory of a mobile phone according to claim 1, further comprising a phone cradle arranged to be fastened in a car.

3. An accessory of a mobile phone according to claim 1, further comprising a phone cradle arranged to be placed on a table-top.

4. An accessory of a mobile phone according to claim 1, further comprising a connector for connecting at least one external signal line to the mobile phone, said projection being a projection of said connector for covering at least one of the at least two openings in the cover of the mobile phone when said connector is attached to the mobile phone.

5. The accessory of claim 1 wherein at least one of the at least two openings in the cover of the mobile phone remains uncovered when the accessory is attached to the mobile phone.

6. The accessory of claim 1 wherein when the accessory is attached to the mobile phone a noise suppression feature of the pressure gradient microphone is disabled and wherein sound from a side of the mobile phone and a distance from the mobile phone is detected by the microphone.

7. An accessory for a mobile phone, which mobile phone has a pressure gradient microphone and a cover with at least two openings in the cover for passing acoustic waves to the pressure gradient microphone, wherein said accessory comprises a projection for covering at least one of the at least two openings in the cover of the mobile phone when said accessory is attached to the mobile phone, and wherein said projection comprises a strip which substantially covers at least a first opening of said at least two openings in the cover of the mobile phone when the accessory is attached to the mobile phone, which first opening is further away from the user than a second opening of said at least two openings in a typical use position associated with the accessory.

8. An accessory of a mobile phone according to claim 7, wherein said strip comprises an integral extension of a wider strip.

9. An accessory for a mobile phone, which mobile phone has a pressure gradient microphone and a cover with at least two openings in the cover for passing acoustic waves to the pressure gradient microphone, wherein said accessory comprises a projection for covering at least one of the at least two openings in the cover of the mobile phone when said accessory is attached to the mobile phone, and wherein said projection is formed on a connector for connecting at least one external signal line to the mobile phone, and said projection covers at least one of the at least two openings in the cover of the mobile phone when said connector is attached to the mobile phone.

10. The accessory of claim 9 wherein at least one of the at least two openings in the cover of the mobile phone remains uncovered when the accessory is attached to the mobile phone.

11. An accessory for a mobile phone having a cover and a pressure gradient microphone with at least two openings in the cover for passing acoustic waves to the pressure gradient microphone, said accessory comprising:
    a connector for connecting at least one external signal line to said mobile phone; and
    a flange on said connector covering at least one of the at least two openings in the cover of the mobile phone when said connector is attached to the mobile phone.

12. An arrangement for handsfree operation of a mobile phone, which arrangement includes at least a mobile phone having a pressure gradient microphone and a cover with at least two openings in the cover for passing acoustic waves to the pressure gradient microphone, and an accessory for the mobile phone comprising a projection for covering at least one of the at least two openings in the cover of the mobile phone when the mobile phone is attached to the accessory.

13. An arrangement according to claim 12, wherein the accessory further comprises a phone cradle.

14. An arrangement according to claim 12, wherein the accessory further comprises a connector for connecting at least one external signal line to the mobile phone, said projection being a projection of said connector for covering at least one of the at least two openings in the cover of the mobile phone when said connector is attached to the mobile phone.

15. The arrangement of claim 12 wherein at least one of the at least two openings in the cover of the mobile phone remains uncovered when the mobile phone is attached to the accessory.

16. The arrangement of claim 12 wherein when the accessory is attached to the mobile phone a noise suppression feature of the pressure gradient microphone is disabled and wherein sound from a side of the mobile phone and a distance from the mobile phone is detected by the microphone.

17. An arrangement for handsfree operation of a mobile phone, which arrangement includes at least a mobile phone, having a pressure gradient microphone, a cover for the mobile phone with at least two openings for passing acoustic waves to the pressure gradient microphone, and an accessory for the mobile phone comprising a connector for connecting at least one external signal line to the mobile phone, and a flange on said connector for covering at least one of the at least two openings in the cover of the mobile phone when the accessory is attached to the mobile phone.

18. A part of a cradle for a mobile phone, which mobile phone has a pressure gradient microphone and a cover with at least two openings in the cover for passing acoustic waves to the pressure gradient microphone, wherein said part comprises a bridge or a projection which is arranged to cover at least one opening of the at least two openings of the cover of the mobile phone when the mobile phone is placed in the cradle.

19. The part of claim 18 wherein at least one of the at least two openings in the cover of the mobile phone remains uncovered when the mobile phone is placed in the cradle.

* * * * *